United States Patent
Hedtke

(10) Patent No.: US 7,255,012 B2
(45) Date of Patent: Aug. 14, 2007

(54) PROCESS FLUID FLOW DEVICE WITH VARIABLE ORIFICE

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 12 days.

(21) Appl. No.: 11/000,564

(22) Filed: Dec. 1, 2004

(65) Prior Publication Data

US 2006/0112773 A1    Jun. 1, 2006

(51) Int. Cl.
*G01F 1/42*    (2006.01)

(52) U.S. Cl. .................................. 73/861.61

(58) Field of Classification Search ............ 73/861.52, 73/862.325, 862.321, 861.61; 137/73, 10, 137/486
See application file for complete search history.

(56) References Cited

U.S. PATENT DOCUMENTS

| | | | | |
|---|---|---|---|---|
| 4,353,500 A | * | 10/1982 | Brown | 236/34.5 |
| 5,327,790 A | * | 7/1994 | Levin et al. | 73/862.325 |
| 5,971,015 A | * | 10/1999 | Gonsior | 137/533.11 |
| 6,154,686 A | | 11/2000 | Hefferen et al. | 700/276 |
| 6,311,568 B1 | | 11/2001 | Kleven | 73/861.42 |
| 6,539,968 B1 | * | 4/2003 | White et al. | 137/10 |
| 2004/0177703 A1 | | 9/2004 | Schumacher et al. | 73/861.52 |

FOREIGN PATENT DOCUMENTS

| | | |
|---|---|---|
| EP | 0 565 485 A1 | 3/1993 |
| GB | 1 379 772 | 1/1975 |
| WO | WO97/28390 | 8/1997 |

OTHER PUBLICATIONS

"Sensor, actuator and loop validation," IEEE Colloquium on Advances in Control Technology, May 25, 1999, pp. 1-10.
International Search Report and Written Opinion from Appln No. PCT/US2005/041807, filed Nov. 18, 2005.
"Iris Diaphragm Valves," Chemical Equipment, Kemutec Group, Inc. Bristol, PA, 1 Page.

* cited by examiner

*Primary Examiner*—Jewel Thompson
(74) *Attorney, Agent, or Firm*—Westman, Champlin & Kelly, P.A.

(57) ABSTRACT

A process device providing total fluid flow control is provided. The device includes a closure mechanism disposed in a flow conduit. The closure mechanism, which is preferably an iris-type diaphragm, provides a variable internal diameter. The device includes a differential pressure sensor for sensing the differential pressure on opposite sides of the diaphragm. A controller receives an indication of differential pressure and generates a control signal to an actuator that actuates the closure mechanism. The closure mechanism, differential pressure sensor and controller create a closed-loop flow controller in a single process device.

28 Claims, 4 Drawing Sheets

PROCESS FLUID FLOW DEVICE WITH VARIABLE ORIFICE

BACKGROUND OF THE INVENTION

The present invention is related to industrial process control and measurement devices. More particularly, the present invention is related to an integrated device that controls fluid flow therethrough.

Field devices, such as process variable transmitters, are used by a number of industries to remotely sense or control a process variable. Such variables are generally associated with fluids such as slurries, liquids, vapors, gasses, chemicals, pulp, petroleum, pharmaceuticals, food, and other fluid processing plants. Process variables may include pressure, temperature, flow, turbidity, density, concentration, chemical compensation, and other properties. Other examples of field devices include valves, actuators, heaters, and controllers.

In the past, an industrial process fluid flow control system generally required multiple components. For example, a first field device, such as a process variable fluid flow transmitter would have a fluid obstruction device, such as an orifice plate, disposed in the fluid flow. The flow transmitter would then measure differential pressure across the fluid flow device and calculate the mass flow of the fluid passing therethrough. The flow transmitter would then convey the fluid flow information to a process controller, which may be a computer located in a control room, or even another field device mounted in the field. The controller would then apply a control algorithm to both the flow measurement information received from the process fluid flow transmitter and a known flow set point provided to, or otherwise known by, the controller. The controller then generates a fluid flow output that is conveyed to yet another field device, generally a valve, to modify the fluid flow through the system based upon the applied control algorithm. Such a closed-loop fluid flow control system is known in the art.

Recently, iris-diaphragm control valves have been used in conjunction with flow measurement to provide systems that can regulate fluid flow. Iris-diaphragm control valves are similar in concept to the optical shutter of a camera. The iris is generally comprised of three or more fingers that extend into the flow area and obstruct fluid flow through the flow area. One such iris-diaphragm control valve is sold by the Emile Eggar and Ciesa Pump and Machine Manufacturers in Switzerland. While work has been done to provide closed-loop fluid flow control systems using iris-diaphragm control valves, there is significant need for improvements. For example, each different device in the flow control system introduces additional costs as well as additional process fluid seals that may fail. Further, each process device used in a flow control system will also require additional technician time for installation and/or maintenance.

SUMMARY OF THE INVENTION

A process device providing total fluid flow control is provided. The device includes a closure mechanism disposed in a flow conduit. The closure mechanism, which is preferably an iris-type diaphragm, provides a variable internal diameter. The device includes a differential pressure sensor for sensing the differential pressure on opposite sides of the diaphragm. A controller receives an indication of differential pressure and generates a control signal to an actuator that actuates the closure mechanism. The closure mechanism, differential pressure sensor and controller create a closed-loop flow controller in a single process device.

DETAILED DESCRIPTION OF THE PREFERRED EMBODIMENTS

Figure 1:
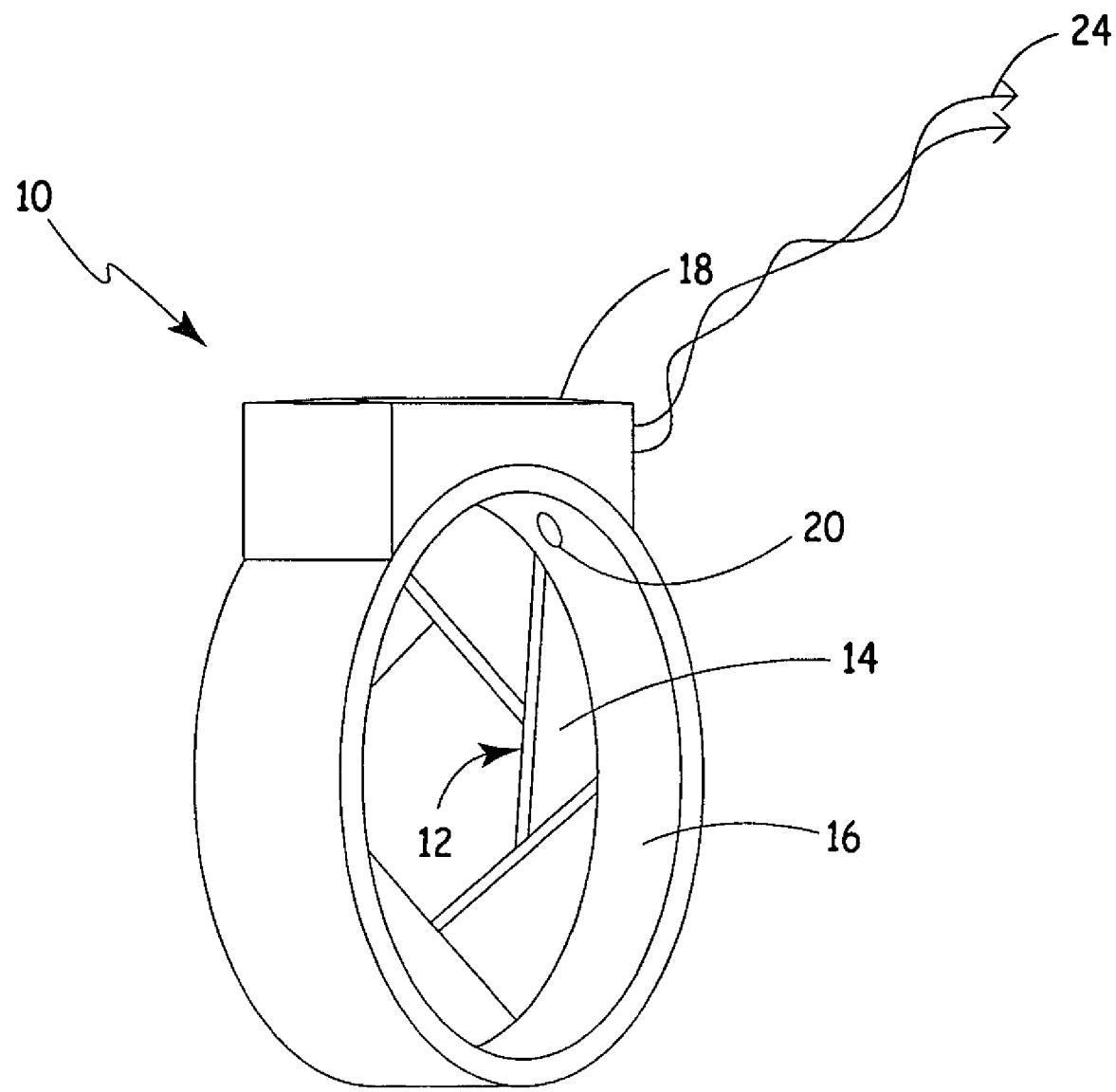
FIG. 1 is a perspective view of a process fluid flow device in accordance with embodiments of the present invention.
Figure 2A:
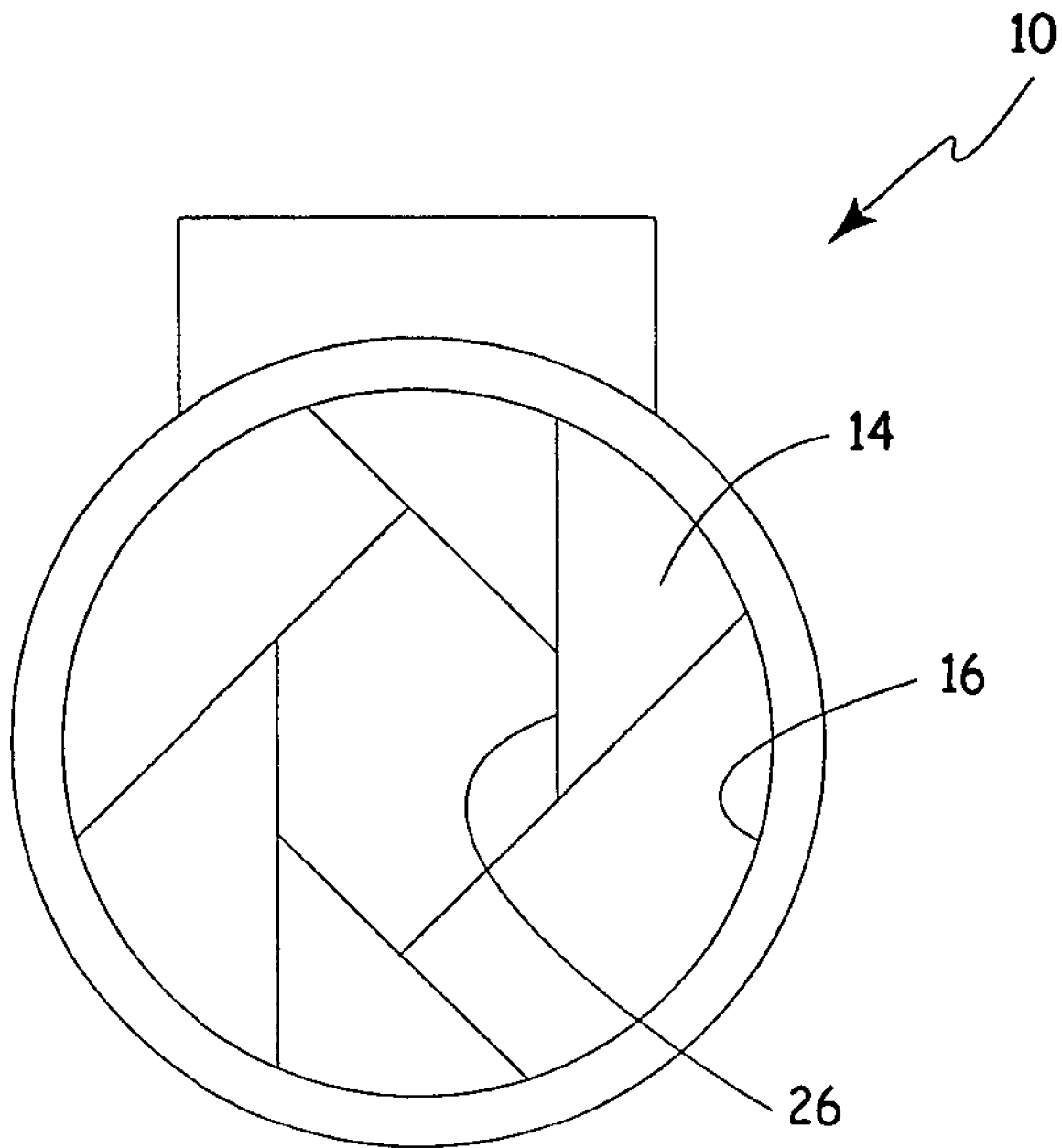
FIG. 2A is a front elevation view of process fluid flow control device in accordance with an embodiment of the present invention.

FIGS. 1 and 2A are perspective and front elevation views, respectively, of a process fluid flow device in accordance with embodiments of the present invention. Device 10 is a fully integrated process fluid flow control system in that it includes an actuator for changing fluid flow therethrough; a sensor for sensing fluid flow therethrough; and a controller for generating an actuator signal based upon the sensed flow signal and a control algorithm. In order to simplify fluid flow calculations, it is preferred that the fluid control mechanism be an iris-diaphragm flow valve. As the number of fingers used to create the iris is increased, the internal shape of the associated opening becomes more and more circular. Thus, once a sufficient number of fingers are used, for example six, the flow characteristics of the device begin to sufficiently approximate an orifice plate. Fluid flow through an orifice plate is well known and flow characteristics relative to orifice plates are well known and extensively documented. However, embodiments of the present invention can be practiced with other types of valves, such as a flapper shutter, for example. Iris-type flow valve 12 includes a number (six in FIG. 1) of fingers or blades 14 that extend into flow conduit 16. The degree to which blades 14 extend into conduit 16 controls the amount of fluid that may flow therethrough. Device 10 also includes electronics compartment 18 and pressure sensors 20, 22 disposed on opposite sides of valve 12.

Electronics compartment 18 includes suitable electronic circuitry to couple to and communicate over process communication loop 24 in accordance with an industry standard process communication protocol. Examples of such protocols include the HART® protocol as well as the all-digital FOUNDATION™ Fieldbus protocol. However any other suitable process industry standard communication protocols can be employed in accordance with embodiments of the present invention. Preferably, the process industry standard protocol is one that can provide power to device 10. Thus, device 10 may receive all of its electrical power over the same conductors that it uses for communication.

Preferably, the fluid flow control mechanism 12 is an iris-diaphragm type valve that generally provides a variable orifice substantially coaxial with conduit 16. The coaxial orifice allows device 10 to have flow characteristics that approximate an orifice plate. Descriptions of various orifice plates and nozzle plates and the calculations and equations associated therewith are described in Liptak, Beto, Instrument Engineer's Handbook: Process Measurement and Analysis, Third Edition, Chilton Book Company (1995) and Miller, Richard, Flow Measurement Engineering Handbook, Third Edition, McGraw-Hill, Inc. (1996).

FIG. 2A is a front elevation view of process fluid flow control device 10 in accordance with an embodiment of the present invention. As illustrated in FIG. 2A, six fingers 14 extend into an inner passageway 16 of device 10. Each of fingers 14 is illustrated in FIG. 2A having a substantially straight edge 26. Fingers 14 can be constructed from any suitable material including metals, polymers, plastics and any combination thereof. For example, for relatively low-flow, clean applications, such as HVAC or automotive applications, fingers 14 may be constructed from polytetrafluoroethylene (PTFE) which is both inert and potentially self-sealing. If the mechanical demands for the valve mechanism 12 increase, fingers 14 could even be constructed from PTFE-coated metal, such as stainless steel, or other suitable reinforced constructions. As fingers 14 are moved further into the flow area 16 of device 10, the aperture defined by straight edges 26 of fingers 14 becomes smaller and smaller. Ultimately, as fingers 14 are moved to their maximum closed position, the device completely closes like a valve. The orifice diameter can be changed among pre-selected closure levels such as in 5 percent increments, or it can be continuous. In embodiment where the closure levels are preselected, the exact beta ratio (beta ratios will be explained in more detail below) for each pre-selected closure level could be measured or calculated and stored. This would allow highly accurate flow calculations such closure levels. Preferably, the fingers can be biased such that a customer-selected failure mode is provided. For example, the fingers can be biased inwardly such that if the device fails, the fingers will obstruct fluid flow.

In order to approximate flow through device 10, differential pressure is measured across flow control mechanism 12. Typically, orifice plates are characterized by their beta ratio that is a function of, among other things, the internal diameter of the orifice plate. Accordingly, embodiments of the present invention that provide a variable orifice, naturally have varying beta ratios. The beta ratio is required for solving for flow rate through device 10 based upon the differential pressure. Accordingly, some embodiments of the present invention include characterizing or otherwise calibrating the device with known fluid flow (measured from a device external to device 10) at varying internal diameters. At each internal diameter, the known flow can be used in combination with the known diameter to calculate the beta ratio for that diameter. A plurality of diameter/beta ratio pairs, can then be stored in a look up table for use during operation. Additionally, if the function of internal diameter and beta ratios can be approximated by an equation, the equation itself could be used instead of a look-up table. In order to better conform the varying beta ratios to the varying internal diameter of mechanism 12, embodiments of the present invention also include modifying the configuration of edges 26 such that the beta ratio is easier to estimate accurately. Calibration can also include providing the device with an indication that there is zero flow, which allows the device to be zeroed. Additionally, the device can check its span by varying the orifice size during a constant flow. In addition to this calibration, the device can periodically, or as requested, perform a system diagnostic. For example, having the ability to both affect flow and measure flow allows the device to perform a check by momentarily changing the closure level, and monitoring the associated change in differential pressure. If the expected change is not observed, an alarm, or other appropriate indication, can be provided.

Figure 2B:
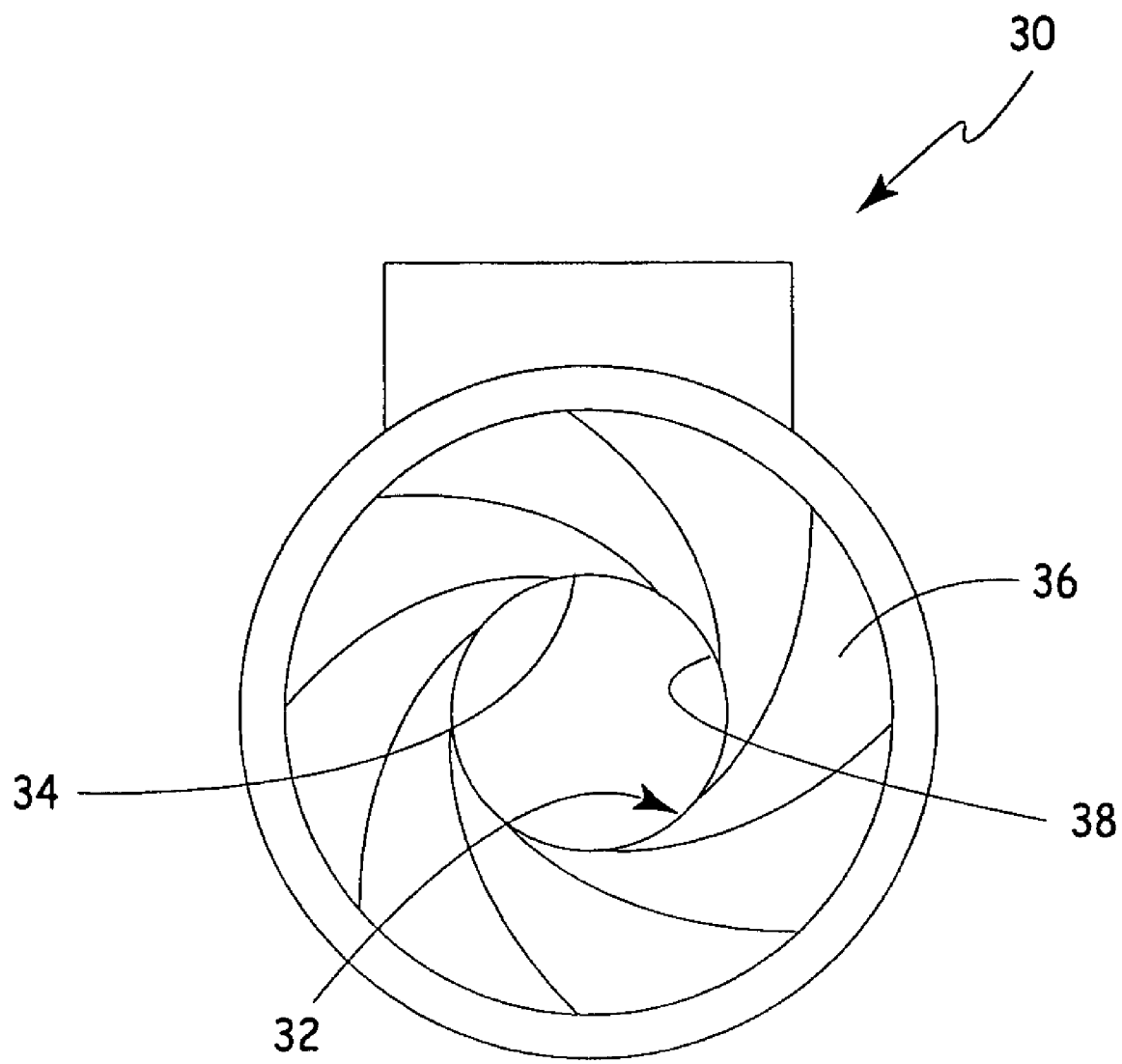
FIG. 2B is a front elevation view of process fluid flow control device in accordance with embodiments of the present invention.

FIG. 2B is a front elevation view of process fluid flow control device 30 in accordance with embodiments of the present invention. Device 30 is similar to device 10 in that it uses a measurement of differential pressure across closure mechanism 32 to calculate fluid flow through the device. However, unlike device 10, device 30 includes a number of fingers 36 that each have a curved surface 34. The combination of the eight fingers 36 shown in FIG. 2B with their curved surfaces 34 provides a substantially circular internal diameter 38. By enhancing the circular nature of the internal diameter 38, device 30 more closely approximates the flow characteristics of an orifice plate. Accordingly, equations and calculations associated with orifice plates will be more accurate with respect to device 30 than with device 10. As set forth above with respect to FIG. 2A, each of fingers 36 can be constructed from any suitable material, such as PTFE, or PTFE-coated metals.

Figure 3:
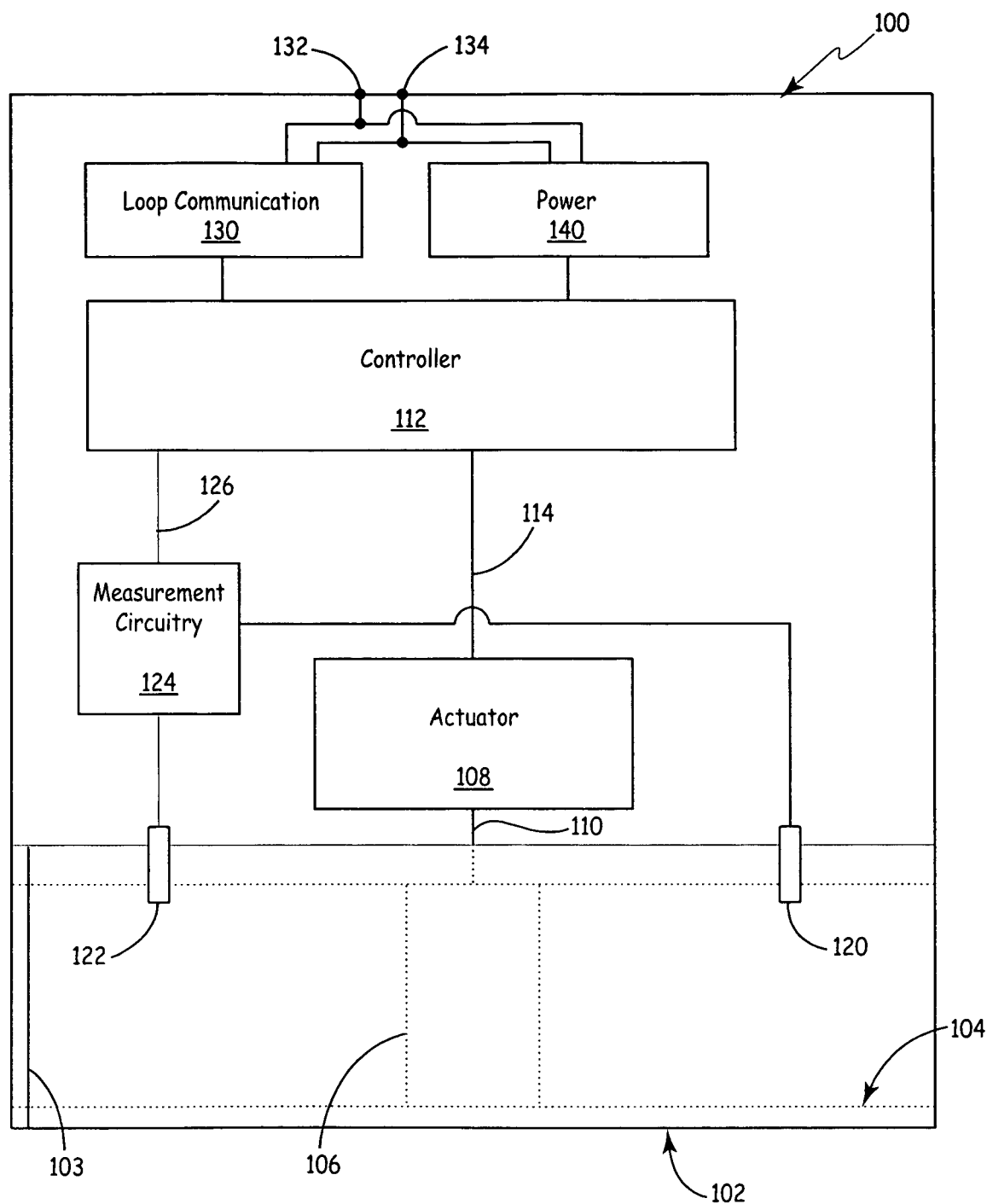
FIG. 3 is a diagrammatic view of a process fluid flow control device in accordance with embodiments of the present invention.

FIG. 3 is a diagrammatic view of a process fluid flow control device in accordance with embodiments of the present invention. Device 100 includes flow-through portion 102 having an internal passageway 104 passing therethrough. An optional high pressure shut-off valve 103 is provided to allow passageway 104 to be interrupt high pressure flow. Valve 103 can be manually actuated, or can be actuated by a suitable actuation from actuator 108. While shut-off valve 103 is illustrated as part of device 100, valve 103 can optionally be disposed remotely from device 100. Disposed proximate internal passageway 104, closure portion 106 is positioned to selectively control the amount of process fluid that passes through portion 104. Closure mechanism 106 is coupled to actuator driver 108 via one or more connections 110. Preferably, closure mechanism 106 is an iris-type diaphragm, but may be any suitable closure member. Actuator 108, based upon a control signal received from controller 112 through line 114, causes physical displacement relative to closure mechanism 106 in order to cause closure mechanism 106 to provide an appropriate amount of pipe closure.

Actuator 108 may include any suitable type of actuating mechanism including, but not limited to, electric motors, suitable gearing reductions, a pneumatic actuator, as well as any other appropriate device capable of transforming a source of potential energy, such as electricity or compressed air, into physical displacement suitable for driving closure mechanism 106.

Device 100 also includes a differential pressure sensor in order to sense differential pressure of the process fluid across closure mechanism 106. The differential pressure sensor may be formed of a pair of impulse lines disposed on opposite sides of closure mechanism 106 and coupled to a differential pressure cell. However, in one embodiment, the differential pressure sensor is formed by two discrete pressure sensors 120, 122 that are positioned on different sides of mechanism 106. Preferably, pressure sensors 120, 122 are formed of a semiconductor material. These types of pressure sensors are taught in the U.S. Pat. No. 5,637,802, assigned to the assignee of the present invention. Such semiconductor-based pressure sensors generally provide a capacitance that varies with deflection of a portion of the semiconductor sensor. The deflection is in response to an applied pressure. The use of semiconductors, and in particular, sapphire, provides a number of advantages. Sapphire is an example of a single-crystal material that when properly fusion-bonded has no material interface between the two bonded portions. Thus, the resulting structure is exceptionally robust. Additionally, semiconductor-based sensors have extremely good hysteresis as well as an extremely high frequency response. Additional information related to semiconductor-based pressure sensors can be found in U.S. Pat. Nos. 6,079,276; 6,082,199; 6,089,907; 6,485,585; and 6,520,020, all of which are assigned to the assignee of the present invention. The use of a sapphire-based pressure sensor is particularly beneficial in embodiments, such as that illustrated in FIG. 3, where the pressure sensor itself is exposed to the process fluid. Sapphire is very corrosion resistant.

Measurement circuitry 124 is coupled to each of pressure sensors 120, 122 and is adapted to drive a suitable energization signal through pressure sensors 120, 122 in order to generate measurements of the pressure-variable electrical response. For example, where pressure sensors 120, 122 are capacitance-type pressure sensors measurement circuitry 124 is able to drive a suitable signal through sensors 120, 122 in order to measure the relative capacitances of sensors 120, 122. Measurement circuitry 124 is coupled to controller 112 and provides an indication of the measured pressures to controller 112 over line 126. Preferably, measurement circuitry 124 provides the measured pressures in digital form, but any suitable form can be used.

Controller 112 is preferably a microprocessor and able to execute a suitable control algorithm to relate the energization output signal 114, provided to actuator 108, to the differential pressure measured across closure mechanism 106. The control algorithm can be a proportional, derivative, integral control algorithm, or any combination thereof.

Loop communication module 130 couples controller 112 to loop communication terminals 132, 134. Loop communication module 130 is adapted to communicate over a process communication loop via terminals 132, 134 in accordance with a process industry standard communication protocol. This communication allows device 100 to receive a process fluid flow set point from the process communication loop. Additionally, the communication, which is generally bi-directional, allows device 100 to report information relative to its operation, or any sub-components thereof. Device 100 also includes power module 140 that powers device 100 with energy received via terminals 132, 134. Accordingly, device 100 can be powered by the same conductors over which it communicates. However, in some embodiments, power module 140 may receive power from one or more sources that are not the communication media. Thus, power module 140 may simply couple to 110 volt 60 hertz power, or any other suitable power source.

In accordance with an embodiment of the present invention, device 100 may advantageously utilize a secondary indication of differential pressure of the process fluid passing therethrough. For example, if closure mechanism 106 is an iris-diaphragm valve, the pressure exerted upon the iris surface by the differential pressure of the fluid may cause the iris fingers to bind slightly. The degree of binding can be related to the differential pressure. Accordingly, the amount of energy required to actuate closure mechanism 106 by actuator 108 may provide a secondary indication of differential pressure. Thus, sensing the back EMF of an electric actuator mechanism, or the differential pressure across a pneumatic motor would provide this secondary indication of process fluid differential pressure. While not necessarily as precise as using sensors 120, 122, the secondary indication of differential pressure may provide an added element of redundancy and/or the ability to provide enhanced diagnostics for the device.

In accordance with another embodiment of the present invention, the device can act as a variable orifice differential pressure flowmeter. Thus, instead of controlling fluid flow, orifice changes can be employed in order to better measure flow. For example, the device may operate at a first closure level and sense fluid flow therethrough. As the sense fluid flow rate drops to a low threshold, where measurement accuracy may be lessened, the device can increase the closure level thus increasing the detectable differential pressure and overall accuracy of the flow measurement. This automatic ranging can occur at selected low and high thresholds. For example, whenever a reading is within 10% of the low or high DP measurement limit, the orifice closure level can be increased or decreased, respectively, as desired.

Although the present invention has been described with reference to preferred embodiments, workers skilled in the art will recognize that changes may be made in form and detail without departing from the spirit and scope of the invention.

What is claimed is:

1. A process fluid flow control device comprising:
   a closure mechanism disposed in a flow conduit, the closure mechanism providing a selective degree of fluid flow obstruction through the flow conduit;
   an actuator coupled to the closure mechanism to control the selective degree of fluid flow obstruction based upon a control signal;
   a differential pressure sensor disposed to sense differential process fluid pressure across the fluid flow obstruction;
   measurement circuitry coupled to the differential pressure sensor, the measurement circuitry configured to obtain an indication of differential pressure from the differential pressure sensor;
   a controller coupled to the measurement circuitry and the actuator, the controller executing a control algorithm to generate the control signal based on the indication of differential pressure; and
   a loop communication module coupled to a plurality of loop terminals and the controller, the loop communication module being adapted to communicate in accordance with a process industry standard protocol.

2. The device of claim 1, wherein the closure mechanism is an iris-type diaphragm.

3. The device of claim 2, wherein the iris-type diaphragm is comprised of a plurality of fingers that are extendable into the flow conduit.

4. The device of claim 3, wherein the plurality of fingers are constructed from polytetrafluoroethylene.

5. The device of claim 3, wherein the plurality of fingers are constructed from polytetrafluoroethylene-coated metal.

6. The device of claim 2, wherein each finger includes a curved surface to create a curved inner diameter.

7. The device of claim 2, wherein the iris-type diaphragm is self-sealing.

8. The device of claim 1, wherein the actuator includes an electric motor.

9. The device of claim 8, wherein the electric motor generates a back electromotive force (emf) that provides a secondary indication of differential pressure.

10. The device of claim 1, wherein the actuator includes a pneumatic motor.

11. The device of claim 10, wherein differential pressure across the pneumatic motor provides an indication of process fluid differential pressure across the closure mechanism.

12. The device of claim 1, wherein the actuator includes a manual actuator.

13. The device of claim 1, wherein the controller is a microprocessor.

14. The device of claim 13, and further comprising memory containing a relationship between beta ratio and internal diameters of the closure mechanism.

15. The device of claim 14, wherein the relationship is a mathematical relationship.

16. The device of claim 14, wherein the relationship is approximated in a look-up table stored in the memory.

17. The device of claim 1, and further comprising a power module couple to the plurality of terminals and being adapted to power the device with energy received through the plurality of terminals.

18. The device of claim 17, wherein the device is wholly powered over the same conductors upon which it communicates.

19. The device of claim 1, and further comprising a high-pressure shut-off valve coupled to the flow conduit.

20. A method of controlling process fluid flow using a single process device, the method comprising:
measuring a differential pressure of process fluid flowing through an iris-diaphragm;
generating a control output based upon a selected fluid flow setpoint and the measured differential pressure; and
adjusting the iris-diaphragm based upon the control output.

21. The method of claim 20, wherein the setpoint is conveyed to the device over a process communication loop.

22. The method of claim 21, and further comprising providing electrical power to the device from the process communication loop.

23. The method of claim 20, wherein adjusting the iris-diaphragm includes choosing among pre-selected closure levels.

24. The method of claim 20, wherein adjusting the iris-diaphragm includes selecting a continuous closure level.

25. A method of measuring process fluid flow, the method comprising:
directing the process fluid flow through a variable orifice;
measuring differential pressure of the process fluid across the variable orifice; an&
adjusting the variable orifice if the measured fluid flow meets a selected threshold.

26. The method of claim 25, wherein adjusting the variable orifice is done automatically.

27. A method of verifying operation of a process fluid flow device having a variable orifice and a differential pressure sensor disposed to sense differential pressure across the variable orifice, the method comprising:
measuring a first differential pressure across the variable orifice when the variable orifice is set to a first closure level;
setting the variable orifice to a second closure level different than the first closure level;
measuring a second differential pressure across the variable orifice set to the second closure level; and
comparing the first differential pressure with the second differential pressure to generate a verification output.

28. The method of claim 27, and further comprising providing the process fluid flow device with an indication that the fluid flow is constant, such that the first and second measured differential pressures can be used to check for span.

* * * * *

UNITED STATES PATENT AND TRADEMARK OFFICE
CERTIFICATE OF CORRECTION

PATENT NO.       : 7,255,012 B2                                                    Page 1 of 1
APPLICATION NO.  : 11/000564
DATED            : August 14, 2007
INVENTOR(S)      : Hedtke It is certified that error appears in the above-identified patent and that said Letters Patent is hereby corrected as shown below:

Col. 7, line 4, change "couple" to --coupled-- .

Col. 8, line 5, change "an&" to --and-- .

Signed and Sealed this

Twenty-seventh Day of November, 2007

JON W. DUDAS
*Director of the United States Patent and Trademark Office*